United States Patent
Fletcher et al.

(10) Patent No.: US 9,706,508 B2
(45) Date of Patent: Jul. 11, 2017

(54) INTEGRATED AVIONICS SYSTEMS AND METHODS

(71) Applicant: HONEYWELL INTERNATIONAL INC., Morristown, NJ (US)

(72) Inventors: Mitch Fletcher, Glendale, AZ (US); Thom Kreider, Peoria, AZ (US); Walter Edward Rupp, Glendale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 189 days.

(21) Appl. No.: 13/857,890

(22) Filed: Apr. 5, 2013

(65) Prior Publication Data

US 2014/0301384 A1   Oct. 9, 2014

(51) Int. Cl.
*H04W 56/00*   (2009.01)
*H04B 7/185*   (2006.01)

(52) U.S. Cl.
CPC ...... *H04W 56/001* (2013.01); *H04B 7/18506* (2013.01)

(58) Field of Classification Search
CPC .................................................. H04W 56/001
USPC ....... 370/219, 241, 252, 350, 355, 503, 507, 370/508
See application file for complete search history.

(56) References Cited

U.S. PATENT DOCUMENTS

| | | | | |
|---|---|---|---|---|
| 4,383,206 A | * | 5/1983 | Matsuoka et al. | 318/445 |
| 4,733,353 A | | 3/1988 | Jaswa | |
| 4,860,285 A | * | 8/1989 | Miller et al. | 370/507 |
| 5,414,703 A | * | 5/1995 | Sakaue | H04J 3/0632 370/395.4 |
| 5,671,260 A | * | 9/1997 | Yamauchi | H04N 5/926 348/500 |
| 5,875,320 A | * | 2/1999 | Gu | G06F 1/14 713/375 |
| 5,886,562 A | * | 3/1999 | Garrity | G06F 1/10 327/154 |
| 6,137,536 A | * | 10/2000 | Yamaguchi | H04N 5/126 345/213 |
| 6,249,875 B1 | * | 6/2001 | Warren | 713/400 |
| 6,262,940 B1 | * | 7/2001 | Choi | G11C 7/1072 365/230.03 |
| 6,308,223 B1 | * | 10/2001 | Opgenoorth | G06F 9/52 709/248 |
| 6,396,888 B1 | * | 5/2002 | Notani | H04L 25/03133 375/232 |
| 6,424,649 B1 | * | 7/2002 | Laor | H04L 12/5601 370/359 |
| 6,608,514 B1 | * | 8/2003 | Akita | G11C 7/22 327/165 |

(Continued)

*Primary Examiner* — Andrew Lai
*Assistant Examiner* — Andrew C Lee
(74) *Attorney, Agent, or Firm* — Lorenz & Kopf, LLP

(57) ABSTRACT

Systems and methods are described for synchronizing data in a mobile platform. In one embodiment, a method for synchronizing data in a mobile platform is provided. The method includes: receiving a first synchronization signal at a first remote interface unit from a signal generator; receiving a second synchronization signal at a second remote interface unit from the signal generator; and executing a synchronization state machine of the first and second remote interface units based on the first and second synchronization signals to synchronize outputs of the first and second remote interface units.

17 Claims, 4 Drawing Sheets

(56) References Cited

U.S. PATENT DOCUMENTS

| | | | |
|---|---|---|---|
| 6,782,064 B1* | 8/2004 | Schwake | G06F 1/12 375/354 |
| 6,980,568 B1* | 12/2005 | Reynov et al. | 370/503 |
| 7,149,916 B1* | 12/2006 | Marino | H04L 7/0008 365/189.19 |
| 7,325,172 B2* | 1/2008 | Jang | H04W 56/002 455/502 |
| 7,333,725 B1* | 2/2008 | Frazier | G03B 31/04 348/207.99 |
| 7,346,793 B2 | 3/2008 | Sumner | |
| 7,482,450 B2* | 1/2009 | Bach | C07F 15/004 546/2 |
| 7,561,944 B2 | 7/2009 | Yeh | |
| 7,613,212 B1* | 11/2009 | Raz et al. | 370/510 |
| 7,649,910 B1* | 1/2010 | Wechsler et al. | 370/503 |
| 7,792,015 B2 | 9/2010 | Malekpour | |
| 7,852,235 B1 | 12/2010 | Johnson et al. | |
| 7,912,094 B2 | 3/2011 | Hall et al. | |
| 8,015,390 B1 | 9/2011 | Corcoran et al. | |
| 8,812,256 B2* | 8/2014 | Lee et al. | 702/89 |
| 8,873,588 B2* | 10/2014 | Joergensen | 370/503 |
| 8,975,921 B1* | 3/2015 | Sangolli | H03K 19/003 326/46 |
| 2001/0043107 A1* | 11/2001 | Komoto | G06F 1/08 327/299 |
| 2002/0129290 A1* | 9/2002 | Couillard | G06F 1/14 713/400 |
| 2003/0110408 A1* | 6/2003 | Wells et al. | 714/1 |
| 2003/0210603 A1* | 11/2003 | Ong | G11C 7/1051 365/233.1 |
| 2004/0153897 A1* | 8/2004 | Ukon et al. | 714/701 |
| 2005/0110524 A1* | 5/2005 | Glasser | 326/96 |
| 2006/0058926 A1* | 3/2006 | Abbott et al. | 701/1 |
| 2006/0098770 A1* | 5/2006 | Harper | H04L 7/0012 375/356 |
| 2006/0152981 A1* | 7/2006 | Ryu | 365/194 |
| 2006/0161675 A1* | 7/2006 | Ducharme | H04N 21/23406 709/231 |
| 2006/0171413 A1* | 8/2006 | Kim | H04L 69/08 370/466 |
| 2006/0256820 A1* | 11/2006 | Ilnicki | G04G 5/00 370/503 |
| 2007/0023506 A1* | 2/2007 | Lagadec et al. | 235/382 |
| 2007/0036254 A1* | 2/2007 | Kim | H04B 1/40 375/354 |
| 2007/0260925 A1* | 11/2007 | Do | G11C 29/1201 714/30 |
| 2007/0281721 A1* | 12/2007 | Lee | H04W 8/005 455/502 |
| 2007/0286323 A1* | 12/2007 | Shimobeppu | G06F 1/10 375/376 |
| 2008/0094117 A1* | 4/2008 | Stoler et al. | 327/162 |
| 2008/0112437 A1* | 5/2008 | Kramer et al. | 370/503 |
| 2008/0181182 A1* | 7/2008 | Carichner | H04W 56/0015 370/336 |
| 2008/0263380 A1* | 10/2008 | Dryer et al. | 713/400 |
| 2008/0303570 A1* | 12/2008 | Lee | G06F 1/10 327/161 |
| 2009/0110370 A1* | 4/2009 | Shibata | G11B 27/10 386/353 |
| 2009/0161455 A1* | 6/2009 | Ku | G11C 7/1072 365/193 |
| 2009/0201060 A1* | 8/2009 | Ho | H03K 5/06 327/161 |
| 2009/0243677 A1* | 10/2009 | Becker | G11C 7/22 327/158 |
| 2009/0259885 A1 | 10/2009 | O'Connell et al. | |
| 2009/0323704 A1* | 12/2009 | Hall | H04L 12/42 370/401 |
| 2010/0054244 A1* | 3/2010 | Tamura | 370/389 |
| 2010/0074278 A1* | 3/2010 | Dobjelevski et al. | 370/503 |
| 2010/0166022 A1* | 7/2010 | Cho | G05B 19/41815 370/503 |
| 2010/0183016 A1 | 7/2010 | Bonk et al. | |
| 2010/0231275 A1* | 9/2010 | Kitagawa | G11C 5/063 327/158 |
| 2010/0235015 A1* | 9/2010 | Chang | 701/1 |
| 2010/0284223 A1* | 11/2010 | Kaneda | 365/185.11 |
| 2010/0302214 A1* | 12/2010 | Kim | G09G 3/20 345/204 |
| 2011/0142066 A1* | 6/2011 | Kasai et al. | 370/442 |
| 2011/0260759 A1* | 10/2011 | Myouga | H04L 7/02 327/145 |
| 2012/0050614 A1* | 3/2012 | Sawada | G09G 5/008 348/521 |
| 2012/0053761 A1 | 3/2012 | Dayre et al. | |
| 2012/0079310 A1* | 3/2012 | Matsusue | H04J 3/0697 713/400 |
| 2012/0159026 A1* | 6/2012 | Kataoka | H04N 21/242 710/110 |
| 2013/0094272 A1* | 4/2013 | Riho | G11C 11/4076 365/63 |
| 2013/0100832 A1* | 4/2013 | Flinn et al. | 370/252 |
| 2013/0107793 A1* | 5/2013 | Gan | H04B 7/155 370/315 |
| 2013/0315104 A1* | 11/2013 | Miyabe | 370/255 |
| 2014/0019791 A1* | 1/2014 | Bacigalupo | G06F 13/4291 713/400 |
| 2014/0082340 A1* | 3/2014 | Smith, II | G06F 11/1683 712/241 |
| 2014/0241100 A1* | 8/2014 | Pelley | 365/230.05 |

* cited by examiner

INTEGRATED AVIONICS SYSTEMS AND METHODS

TECHNICAL FIELD

The present disclosure generally relates to data communications in a mobile platform, and more particularly to methods and systems for synchronizing data in a communication system of a mobile platform.

BACKGROUND

The latest NASA initiative for Human Space, namely the Space Exploration Vision, continues to require avionics systems that are deterministic and that provide redundant data to flight computers capable of resolving the byzantine fault condition. Many of these systems use heritage sensors and effectors that are controlled by 1553B data busses. In order to implement redundancy, commands to acquire data and receive telemetry need to be synchronized between the redundant channels. These methods of synchronization rely on the flight computer to generate the commands.

It is desirable to provide improved methods and systems for synchronizing the data along redundant channels without using the flight computer in order to off load the flight computer, thus allowing it to perform other important tasks. It is further desirable to provide improved synchronization methods and systems for mobile platforms such as spacecraft and aircrafts. Other desirable features and characteristics will become apparent from the subsequent detailed description and the appended claims, taken in conjunction with the accompanying drawings and this background of the invention.

BRIEF SUMMARY

According to various exemplary embodiments, systems and methods are described for synchronizing data in a mobile platform. In one embodiment, a method for synchronizing data in a mobile platform is provided. The method includes: receiving a first synchronization signal at a first remote interface unit from a signal generator; receiving a second synchronization signal at a second remote interface unit from the signal generator; and executing a synchronization state machine of the first and second remote interface units based on the first and second synchronization signals to synchronize outputs of the first and second remote interface units.

In another exemplary embodiment, a system includes a synchronization signal generator that generates a first synchronization signal and a second synchronization signal. A first remote interface unit receives the first synchronization signal and executes at least one synchronization state machine based on the first synchronization signal. A second remote interface unit receives the second synchronization signal and executes at least one synchronization state machine based on the second synchronization signal to synchronize output of the second remote interface unit with output of the first remote interface unit.

In yet another exemplary embodiment, an avionics system of a mobile platform includes a plurality of sensor systems that transmit redundant data; a plurality of actuator systems that receive redundant data; and a synchronization signal generator that generates at least two synchronization signals. The avionics system further includes at least two remote interface units arrange redundant data paths between the plurality of sensor systems and the plurality of actuator systems, and synchronize the redundant data from the plurality of sensor systems and the redundant data to the actuator systems based on the at least two synchronization signals.

Other embodiments, features and details are set forth in additional detail below.

BRIEF DESCRIPTION OF THE DRAWINGS

The present disclosure will hereinafter be described in conjunction with the following figures, wherein like numerals denote like elements.

DETAILED DESCRIPTION

The following detailed description of the invention is merely example in nature and is not intended to limit the invention or the application and uses of the invention. Furthermore, there is no intention to be bound by any theory presented in the preceding background or the following detailed description. As used herein, the term "module" refers to any hardware, software, firmware, electronic control component, processing logic, and/or processor device, individually or in any combination, including, without limitation: an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
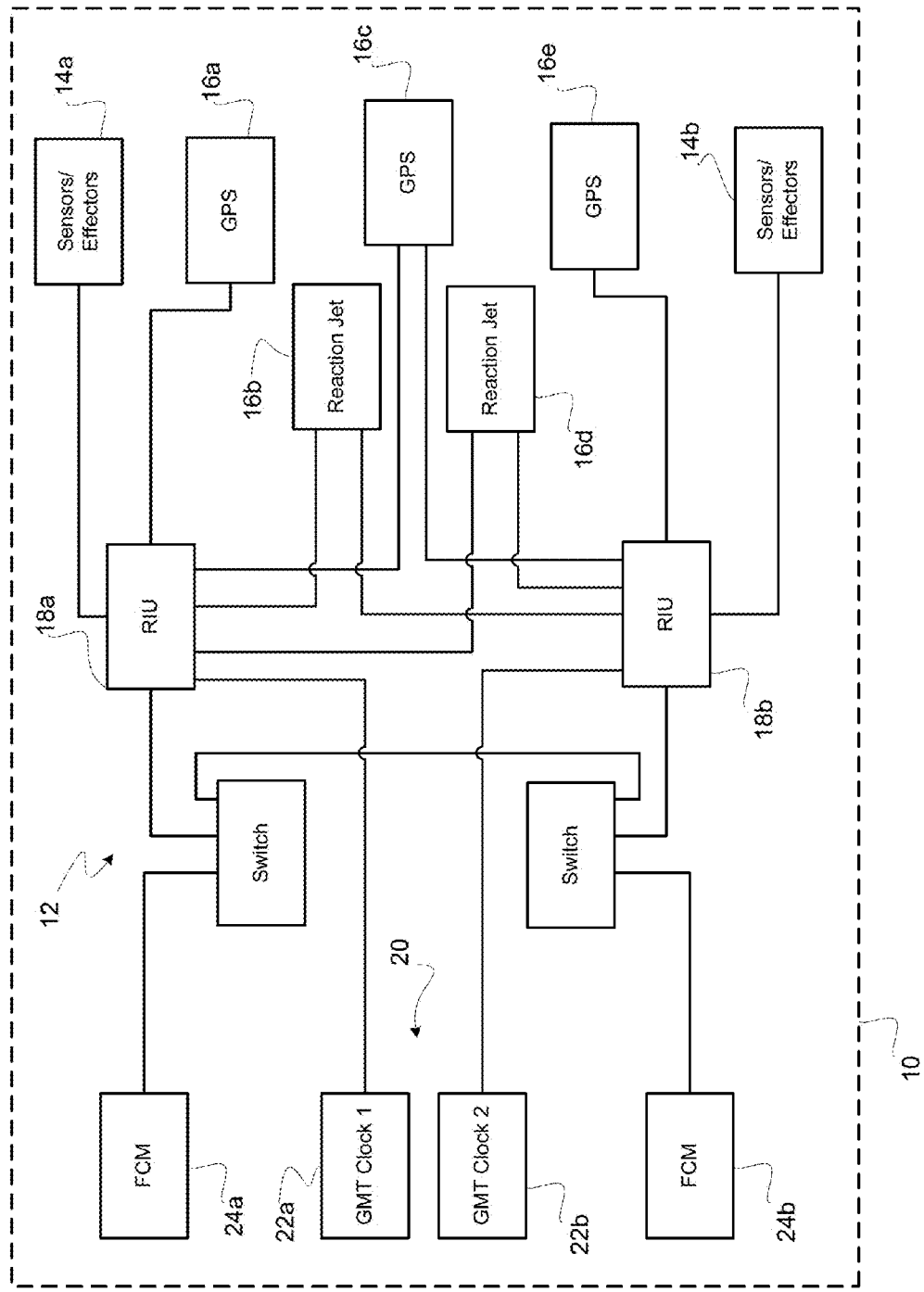
FIGS. 1 and 2 are functional block diagrams illustrating exemplary mobile platform systems including synchronization systems in accordance with exemplary embodiments.
Figure 2:
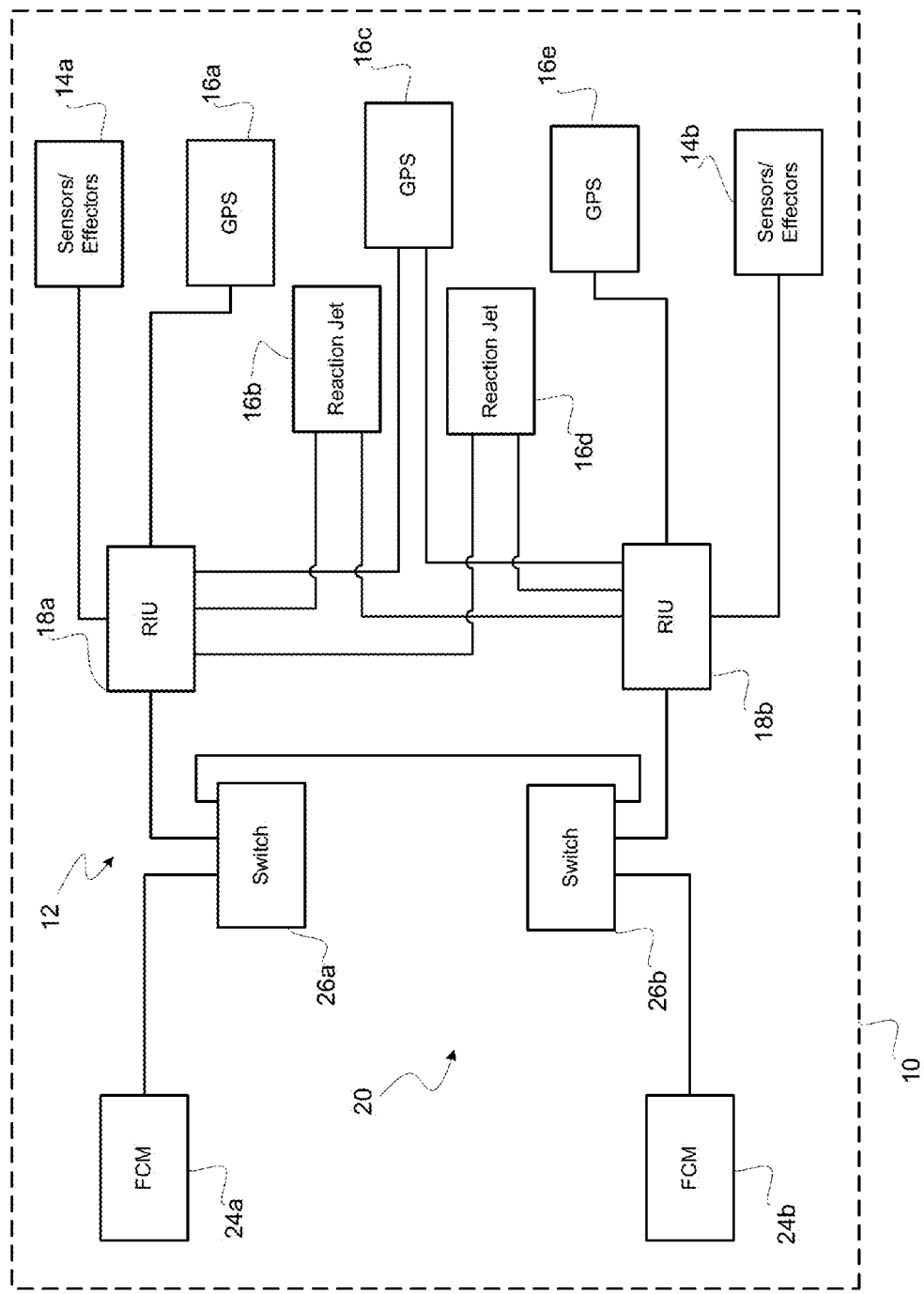

Turning now to the figures and with initial reference to FIGS. 1 and 2, an exemplary avionics system 10 of a mobile platform such as a spacecraft or an aircraft (hereinafter referred to as a spacecraft) is shown in accordance with exemplary embodiments. The avionics system 10 includes a synchronization system shown generally at 12 that synchronizes redundant data along communication channels of the spacecraft in accordance with various embodiments. Although FIGS. 1 and 2 shown herein depict examples with certain arrangements of elements, additional intervening elements, devices, features, or components may be present in actual embodiments. It should also be understood that FIGS. 1 and 2 are merely illustrative and may not be drawn to scale.

As shown in FIGS. 1 and 2, the avionics system 10 includes a plurality of sensor systems 14a-14b and actuator systems 16a-16e that transmit and receive redundant data between at least two RIU controllers 18a and 18b that are arranged as redundant data paths. The synchronization system 12 includes a synchronization signal generator shown generally at 20. In FIG. 1, the synchronization signal generator 20 includes clock 1 22a and clock 2 22b. In various embodiments, the clocks 22a, 22b are GMT clocks. In various other embodiments, the clocks are de-bounced discrete timer. As can be appreciated, the synchronization signal generator 20 can be implemented by a multitude of functional units and is not limited to a clock source. Upon receipt of a synchronization signal 70 (FIG. 4) by the clock sources 22a and 22b, the RIU 18a and 18b execute a sequence of commands as will be described in more detail below. Because each RIU 18a and 18b contains the same sequence, same configuration, and same synchronization, input data is acquired at identical times in each RIU 18a and 18b. In like manner, output data is presented at identical times at all outputs.

As can be appreciated, in the various embodiments including clock sources 22a and 22b, any number of redundant RIUs 18a and 18b may be used as the disclosure is not limited fail-op performance (i.e., two redundant channels). Thus, fail-op, fail-op performance (i.e., three redundant channels) and beyond may be implemented with ease. As can further be appreciated, flight computers 24a and 24b are illustrated though they are not required for the synchronization. The synchronization from the clock 1 22a and clock 2 22b may be presented to the flight computers 24a and 24b, if desired.

In FIG. 2, the synchronization signal generator 20 includes switches 26a and 26b such as TTEthernet switches (e.g. AS6802 ethernet switch). The switches 26a and 26b may or may not be located within the RIUs 18a and 18b. Upon receipt of the synchronization signal 70 (FIG. 4), the RIUs 18a and 18b execute a sequence of commands as will be described in more detail below. Because each RIU 18a and 18b contains the same sequence, same configuration, and same synchronization, the input data is acquired at identical times in each RIU 18a and 18b. In like manner, the output data is presented at the identical times at all outputs.

As can be appreciated, in the various embodiments including switches 26a and 26b, any number of redundant RIUs 18a and 18b may be used as the disclosure is not limited fail-op performance (i.e., two redundant channels). Thus, fail-op, fail-op performance (i.e., three redundant channels) and beyond may be implemented with ease. The synchronization from the switches 26a and 26b may be presented to the flight computers 24a and 24b, if desired.

Figure 3:
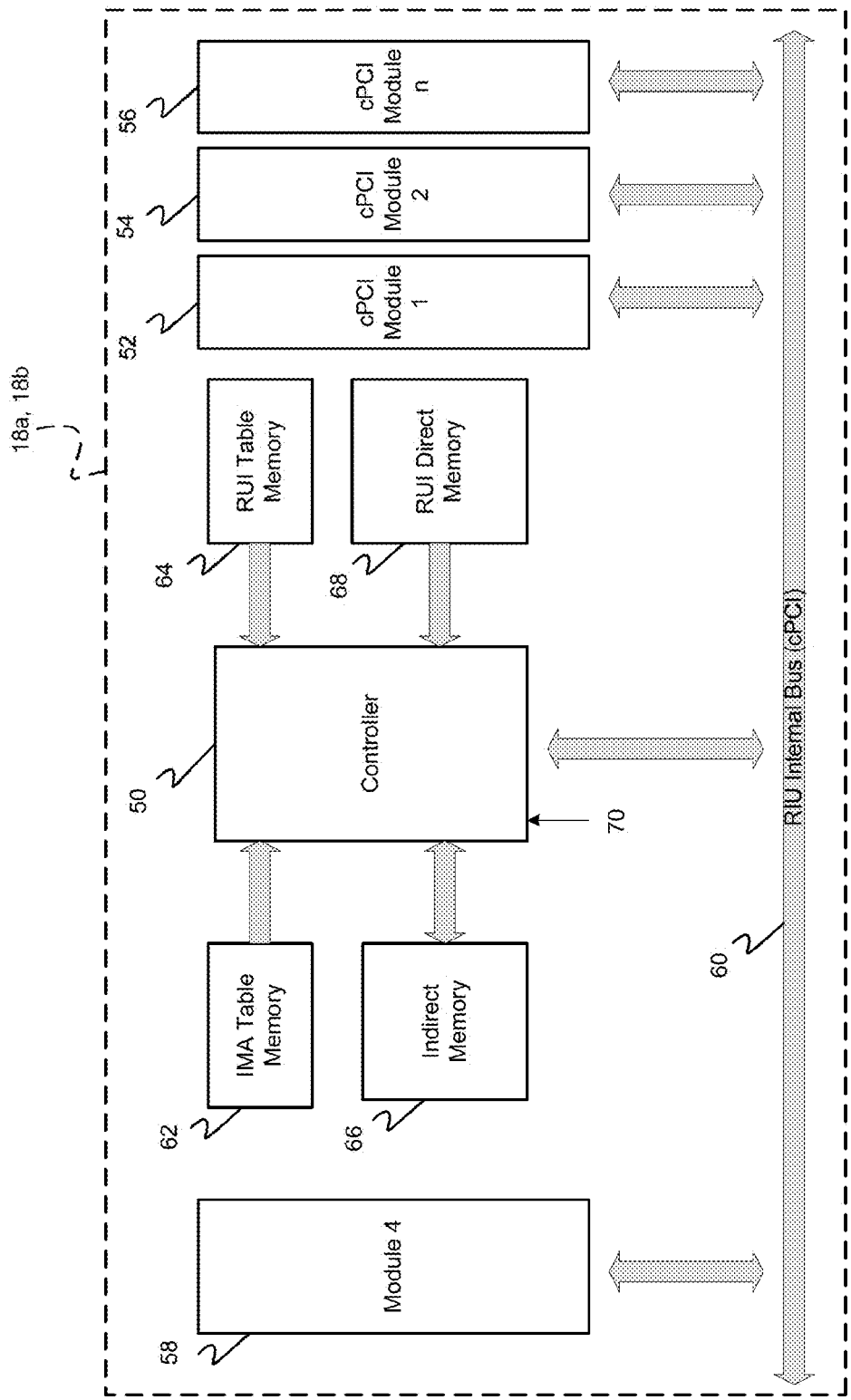
FIG. 3 is a functional block diagram illustrating a functional unit wherein the individual synchronization is mechanized in accordance with exemplary embodiments.

Referring now to FIG. 3, an exemplary functional RIU 18a, 18b wherein the individual synchronization is mechanized is shown in accordance with exemplary embodiments. The RIU 18a, 18b is shown to include at least one controller 50, and one or more modules 52-58 that communicate over an internal bus 60. The modules 52-58 communicate with the components of the avionics system 10 (FIG. 1, 2) (e.g., module 1 52 communicates with sensor system 14a, module 2 54 communicates with sensor system 14b, module 3 56 communicates with actuator system 16a, module 4 58 communicates with the flight computer 24a, and so on). In general, the controller 50 can be a state machine, a processor, or a sequencer that is programmed to process lists of data that is received from the modules 52-58 and that is transferred across the internal bus 60 to one or more of the other modules 52-58. In various embodiments, the internal bus 60 is a cPCI bus and at least some of the modules 52-58 are cPCI modules according to PCIe. As can be appreciated, the internal bus 60 and the modules 52-58 can be implemented using any bus standard and thus, are not limited to the present example.

In various embodiments, the controller 50 is a sequence controller that is associated with one or more memory devices. The one or more memory devices may reside on any type of suitable memory device which may include volatile and non-volatile memory devices. Non-limiting examples of memory devices may include all types of random access memory, flash memory, read only memory (ROM), erasable electronic programmable read only memory (EEPROM), programmable logic devices, magnetic disks, optical disks and any memory devices that currently exist or may be developed in the future. In various embodiments, a single memory may be divided into a plurality of distinct partitions implemented on one memory device. In various other embodiments a plurality of distinct physical devices may be used.

In the various embodiments shown and described, four data structures will be described as being separate memories or table memories. In a non-limiting example, the four memories may comprise a system or an IMA table memory 62, an RIU table memory 64, an indirect memory 66, and an RIU direct memory 68. As can be appreciated, in various other embodiments, the four data structures 62-68 can be combined into one or more data structures without altering the spirit of the invention.

The indirect memory 66 is a temporary working memory, such as a ram buffer, that temporarily stores transient value data as it is being moved into the RIU 18a, 18b. The RIU direct memory 68 contains static data structures that are logical objects that represent data required to be transferred across the bus 60 to cause action from a module 52-58. For example, each data structure contained within the RIU direct memory 68 is associated with a specific module 52-58 on the bus 60 and allows one or more commands in the table memories 62, 64 to be executed. A command is executed when the contents of the data structure from within the RIU direct memory 68 are copied and placed on the bus 60 destined for the module.

As a non-limiting example, the RIU direct memory 68 may contain a sequence of cPCI data that must be sent to the module 52-58 via the cPCI bus 60 to cause the module 52-58 to transmit and/or receive data from its associated avionics component. In the context of avionics, the RIU direct memory 68 contains what would be a "call" to the instructions that usually would be created by a device driver to cause operation of the module 52-58. The data stored in the RIU direct memory 68 replaces the data that usually would be created and then placed on the bus 60 by a board support package.

The IMA table memory 62 is a dedicated memory containing a single, static list of commands in a particular, unvarying order. The commands in the command list cause the sequence controller 50 to send and retrieve various data structures from the RIU direct memory 68, and optionally from the indirect memory 66, over the bus 60 which are received and acted upon by the module 52-58. The commands also store dynamic response data into the indirect memory 66.

The RIU table memory 64 is also a dedicated memory that contains a static list of commands in a particular, unvarying order that may mesh with the commands in the IMA table memory 62. The meshing of the commands in the IMA table memory 62 and the RIU table memory 64 may result is a single unvarying command list.

The commands in the RIU table memory 64 may be specific to one or more of the modules 52-58. The commands in the RIU table memory 64 cause the sequence controller 50 to send and retrieve various data structures contained in RIU direct memory 68, and optionally from indirect memory 66, over the bus 60 which are intended to be received and acted upon by the modules 52-58. The commands also cause the storing of response data from the modules 52-58 into the indirect memory 66. The sequence and timing of the commands in the table memories 62, 64 are predefined so as to not conflict in the time domain of the bus 60.

The table memories 62, 64 may be deterministic in that the command list being executed by the sequence controller 50 remains unaltered by any future events or data values and does not contain any conditional programming language. Therefore, while in nominal operation, the list of commands is cyclically repeated by the sequence controller 50, ad infinitum.

The sequence controller 50 in particular may be any suitably configured electronic controller that currently exists or may exist in the future. The sequence controller 50 may comprise a programmable logic device such as a Field Programmable Gate Array and/or an application specific integrated circuit chip (ASIC), or may be implemented using a microprocessor with application code suitable for the desired function. The sequence controller 50 may be any one or a combination of a single memory controller, multiple memory controllers, a double data rate (DDR) memory controller, a fully buffered memory controller, and any other suitable type of memory controller that may currently exist now or in the future.

The sequence controller 50 ideally has minimal intelligence that may be limited to the ability to sequence instructions. In various exemplary embodiments, the sequence controller 50 manages the movement of data within the RIU 18a, 18b, which operates as a multiplexer/demultiplexer, using data contained in the four memories. While operating, the sequence controller 50 repeatedly executes a non-varying sequence of instructions or the command list implemented in the table memories 62, 64. The instructions may copy or "move" static data structure(s) contained in the RIU direct memory 68 to and from the modules 52-58.

The sequence controller 50 may also store intermediate dynamic data in the indirect memory 66. Dynamic data may be characterized as data that changes over time. For example, the controller may present data to the bus 60 from the RIU direct memory 68 and await a response that may be initiated by the appropriate module 52-58. The sequence controller 50 places the data from the response into the indirect memory 66 as dynamic data. A subsequent response from the module 52-58 may contain different data that may overwrite the previously saved data.

As directed by the command list, the sequence controller 50 may also copy stored static data structures from the RIU direct memory 68 and present those data structures to the bus 60. Further, the sequence controller 50 may present the data structures contained in the RIU direct memory 68 combined with dynamic data that is contained in the indirect memory 66. This may be accomplished by executing a sequence of transfers on the bus 60. Regardless of the function being executed, the specific set of transfers required to complete an entire function are determined by the sequence list contained in the IMA table memory 62 and/or the RIU table memory 64.

In other embodiments where data is to be retrieved from a module 52-58, the sequence controller 50 presents a static data structure contained in the RIU direct memory 68 to the module 52-58 via the bus 60 and then awaits a response from the bus 60 including dynamic data received over the modules 52-58. Once the bus 60 responds, the dynamic data is stored in the indirect memory 66.

In various embodiments, the sequence controller 50 is synchronized to the synchronization signal 70. In other words, the execution of the sequence of instructions from the command list is triggered on a precise, regulated time schedule based on the synchronization signal 70. The regular time schedule synchronizes the other components within the RIU, as well as the avionics components, through the modules 52-58. Thus, when two RIUs are synchronized to the synchronization signals 70, the redundant data and the avionics system is synchronized.

As discussed above, the system synchronization signal 70 can be provided from a multitude of sources such as, but not limited to, TTEthernet, a single pulse, or IRIG-b GMT time base. The sources may be integrated with the RIU 18a, 18b or implemented separate from the RIU 18a, 18b.

Figure 4:
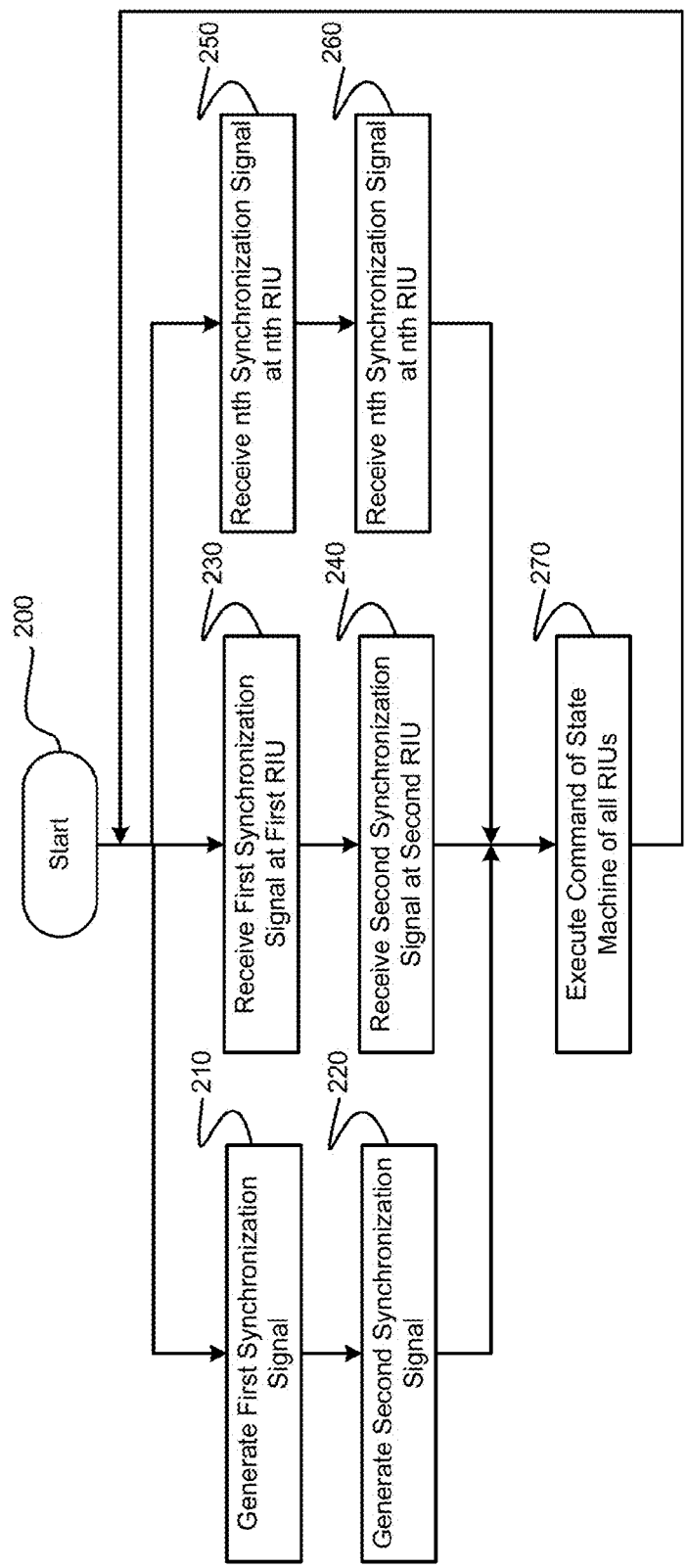
FIG. 4 is a flowchart illustrating an exemplary synchronization method that may be performed by the synchronization systems in accordance with exemplary embodiments.

Referring now to FIG. 4, and with continued reference to FIGS. 1-3, a flowchart illustrates a synchronization method that can be performed by the avionics systems 10 of FIGS. 1 and 2 in accordance with various embodiments. As can be appreciated in light of the disclosure, the order operation within the method is not limited to the sequential execution as illustrated in FIG. 4, but may be performed in one or more varying orders as applicable and in accordance with the present disclosure.

In one example, the method may begin at 200. At 210, a first system synchronization signal 70 is generated by the synchronization signal generator 20. Likewise at 220, a second synchronization signal 70 is generated by the synchronization signal generator 20, and nth synchronization signals are generated by the synchronization signal generator 20 at 230. The first system synchronization signal 70 is received at the first remote interface unit 18a from the synchronization signal generator 20 at 240. The second system synchronization signal 70 is received at the second remote interface unit 18b from the synchronization signal generator 20 at 250; and the nth synchronization signals 70 are received at the nth remote interface units (not shown) from the synchronization signal generator 20 at 160. The synchronization state machine of the first and second remote interface units 18a, 18b and the nth remote interface units (not shown) are executed based on the first, second, and nth system synchronization signals 70 at 270. In particular, the bus actions of the state machines are synchronized by the synchronization signals 70. Thereafter, the method repeats so long as the avionics system 10 is in operation.

As can be appreciated, one or more aspects of the present disclosure can be included in an article of manufacture (e.g., one or more computer program products) having, for instance, computer usable media. The media has embodied therein, for instance, computer readable program code means for providing and facilitating the capabilities of the present disclosure. The article of manufacture can be included as a part of a computer system or provided separately.

Additionally, at least one program storage device readable by a machine, tangibly embodying at least one program of instructions executable by the machine to perform the capabilities of the present disclosure can be provided.

While at least one example embodiment has been presented in the foregoing detailed description of the invention, it should be appreciated that a vast number of equivalent variations exist. It should also be appreciated that the embodiments described above are only examples, and are not intended to limit the scope, applicability, or configuration of the invention in any way. Rather, the foregoing detailed description will provide those skilled in the art with a convenient road map for implementing various examples of the invention. It should be understood that various changes may be made in the function and arrangement of elements described in an example embodiment without departing from the scope of the invention as set forth in the appended claims and their legal equivalents.

What is claimed is:

1. A method for synchronizing data in a mobile platform including a flight computer without using the flight computer for the data synchronization, comprising:
   receiving a first synchronization signal at a first remote interface unit apart from the flight computer from a signal generator at a first time;
   receiving a second synchronization signal at a second remote interface unit apart from the flight computer that is different than the first remote interface unit, the second synchronization signal being received from the signal generator at a time that is identical to the first time;
   presenting data, to a flight computer for communication, which is synchronized based on a first and second synchronizing signal wherein the flight computer is configured for providing the data communication but not for the data synchronization;
   and
   executing a synchronization state machine of the first and second remote interface units based on the first and second synchronization signals, and without use of the flight computer, to synchronize at an identical time an output of the first remote interface unit and an output of the second remote interface unit.

2. The method of claim 1, further comprising generating the first synchronization signal using a first switch; and generating the second synchronization signal using a second switch.

3. The method of claim 2, wherein the first switch is a ethernet switch, and wherein the second switch is a ethernet switch.

4. The method of claim 1, further comprising generating the first synchronization signal using a first clock; and generating the second synchronization signal using a second clock.

5. The method of claim 4, wherein the first and second clocks are de-bounced discrete timers.

6. The method of claim 1, further comprising receiving inputs at a same time to the first and second remote interface units based on the first and second synchronization signals.

7. The method of claim 1, further comprising synchronizing bus actions of the first and second remote interface units based on the based on the first and second synchronization signals.

8. A system for synchronizing data in a mobile platform including a flight computer without using the flight computer for the data synchronization, comprising:
   a synchronization signal generator that generates a first synchronization signal and a second synchronization signal;
   a first remote interface unit apart from the flight computer that receives the first synchronization signal at a first time and that executes at least one synchronization state machine based on the first synchronization signal; and
   a second remote interface unit apart from the flight computer that is different than the first remote interface unit, that receives the second synchronization signal at a time that is identical to the first time and that executes at least one synchronization state machine based on the second synchronization signal to synchronize at an identical time an output of the second remote interface unit with an output of the first remote interface unit; and
   presenting data, to the flight computer for communication, which is synchronized based on the first and second synchronizing signal wherein the flight computer is configured for providing the data communication but not for the data synchronization.

9. The system of claim 8, wherein the synchronization signal generator includes a first switch that generates the first system synchronization signal, a second switch that generates the second system synchronization signal.

10. The system of claim 9, wherein the first switch is a ethernet switch, and wherein the second switch is a ethernet switch.

11. The system of claim 8, wherein the synchronization signal generator includes a first clock that generates the first system synchronization signal, and a second clock that generates the second system synchronization signal.

12. The system of claim 8, wherein the first and second clocks are de-bounced discrete timers.

13. The system of claim 8, wherein the first remote interface unit receives inputs at a same time as the second remote interface unit based on the first and second synchronization signals.

14. The system of claim 8, wherein the first remote interface unit synchronizes bus actions of the first and second remote interface units based on the first and second synchronization signals.

15. An avionic system of a mobile platform including a flight computer without using the flight computer for synchronizing redundant data, comprising:
   a plurality of sensor systems that transmit the redundant data;
   a plurality of actuator systems that receive the redundant data;
   a synchronization signal generator that generates at least two synchronization signals; and
   at least two different remote interface unit controllers that are coupled by redundant data paths between the plurality of sensor systems and the plurality of actuator systems, and that synchronize at an identical time the redundant data from the plurality of sensor systems and the redundant data to the actuator systems based on at least two synchronization signals that are received at identical times; and
   a flight computer that receives the redundant data which is synchronized based on the first and second synchronizing signal wherein the flight computer is configured for providing data communication based on the redundant data having been synchronized at the identical time.

16. The avionics system of claim 15, wherein the synchronization signal generator includes at least two ethernet switches.

17. The avionics system of claim 15, wherein the synchronization signal generator includes at least two de-bounced discrete timers.

* * * * *